US009876521B2

(12) United States Patent
Lai et al.

(10) Patent No.: US 9,876,521 B2
(45) Date of Patent: Jan. 23, 2018

(54) SLIDING STAND ASSEMBLY

(71) Applicant: PEGATRON CORPORATION, Taipei (TW)

(72) Inventors: Wei-Ting Lai, Taipei (TW); Shih-Wei Hung, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 184 days.

(21) Appl. No.: 14/703,902

(22) Filed: May 5, 2015

(65) Prior Publication Data
US 2015/0349830 A1 Dec. 3, 2015

(30) Foreign Application Priority Data

May 28, 2014 (TW) .............................. 103118640 A

(51) Int. Cl.
*H04M 1/00* (2006.01)
*H04B 1/3877* (2015.01)
*F16M 11/20* (2006.01)
*F16M 11/38* (2006.01)
*H04B 1/3888* (2015.01)
*F16M 13/02* (2006.01)

(52) U.S. Cl.
CPC ....... *H04B 1/3877* (2013.01); *F16M 11/2021* (2013.01); *F16M 11/38* (2013.01); *F16M 13/022* (2013.01); *H04B 1/3888* (2013.01)

(58) Field of Classification Search
CPC  H04B 1/3877; H04B 1/3888; F16M 11/2021; F16M 11/38; F16M 13/022

USPC ............................................ 455/575.1, 575.4
See application file for complete search history.

(56) References Cited

U.S. PATENT DOCUMENTS

2002/0130243 A1* 9/2002 Ziegler .................. F16M 11/10
 248/685
2008/0265113 A1* 10/2008 Lin ....................... F16M 11/046
 248/176.3

FOREIGN PATENT DOCUMENTS

| CN | 2615723 Y | 5/2004 | |
| CN | 203259946 U * | 10/2013 | ............... G06F 1/16 |
| TW | M470486 U | 1/2014 | |

* cited by examiner

*Primary Examiner* — Yuwen Pan
*Assistant Examiner* — Fatuma Sherif
(74) *Attorney, Agent, or Firm* — CKC & Partners Co., Ltd.

(57) ABSTRACT

A sliding stand assembly comprises a back cover, a sliding engaging member, a spring, a first stand and a second stand. The sliding engaging member is located at a first surface of the back cover. The sliding engaging member comprises first and second protruding portions. The first stand is slidably pivoted to the back cover. The first stand comprises first to third concave portions. The first concave portion has first and second sub-portions. The second stand is pivoted to the first stand and the back cover. When the first stand slides to a positioning location, the first protruding portion is engaged with the first sub-portion and the second protruding portion is located in the second concave portion. When the first protruding portion moves from the first sub-portion to the second sub-portion, the second protruding portion moves to the third concave portion to be positioned.

10 Claims, 8 Drawing Sheets

SLIDING STAND ASSEMBLY

CROSS-REFERENCE TO RELATED APPLICATIONS

This Non-provisional application claims priority under 35 U.S.C. § 119(a) on Taiwan Patent Application No(s). 103118640 filed in May 28, 2014, the entire contents of which are hereby incorporated by reference.

BACKGROUND

Field of the Invention

This invention relates to a sliding stand assembly.

Description of the Related Art

Recently, there are more and more different kinds of portable electronic device, such as notebook, digital photo frame, desktop all-in-one computer with display, thin television and so on, which have become necessary electronic devices for work or entertainment of people.

A back cover of the abovementioned portable electronic device can be provided with a supporting frame so as to be set up on the desktop for users to operate or view images. When the hinge structure is utilized for support, however, it is difficult to effectively avoid the display from large shakes if the force applied by the user touches the display is only stopped by the torsion of the hinge structure itself. When the link and the torsion spring are utilized for support, touching the top of the display by the user may result in raising, shaking or even toppling. In addition, most products cannot allow the user to open the supporting frame by only one hand so as to result in inconvenience for operating.

BRIEF SUMMARY

An aspect of the present invention is a sliding stand assembly adapted for an electronic device.

According to an embodiment of the present invention, a sliding stand assembly comprises a back cover, a sliding engaging member, a spring, a first stand and a second stand. The back cover has a first surface, a second surface opposite to the first surface, a first hole and a second hole passing through the first surface and the second surface. The sliding engaging member is located at the first surface. The sliding engaging member comprises a first protruding portion and a second protruding portion. The first protruding portion protrudes from the first hole to the second surface. The second protruding portion protrudes from the second hole to the second surface. The spring is connected with the first surface and the sliding engaging member. The first stand is slidably pivoted to the second surface of the back cover. The first stand comprises a first concave portion, a second concave portion and a third concave portion. The first concave portion is disposed corresponding to the first protruding portion and has a first sub-portion and a second sub-portion that are perpendicular to and connected with each other. The second concave portion is disposed corresponding to the second protruding portion. The third concave portion is disposed adjacent to a side edge of the second concave portion. The second stand has a first end edge and a second end edge opposite to the first end edge. The first end edge is pivoted to the first stand and the second end edge is pivoted to the back cover. When the first stand slides to a positioning location, the first protruding portion is engaged with the first sub-portion and the second protruding portion is located in the second concave portion to allow the first stand and the second stand to be in an open state with respect to the back cover for supporting the electronic device. When the first protruding portion moves from the first sub-portion to the second sub-portion, the spring is in tension and the second protruding portion moves to the third concave portion to be positioned. When the first stand then slides to depart from the positioning location, the first protruding portion departs from the second sub-portion and the second protruding portion departs from the third concave portion to allow the sliding engaging member to be repositioned by a resilient force of the spring and to allow the first stand and the second stand to be capable of pivoting with respect to the back cover so as to be in a closed state.

In an embodiment of the present invention, the back cover has a third hole passing through the first surface and the second surface. The sliding engaging member further comprises an operating portion. The operating portion is exposed from the third hole.

In an embodiment of the present invention, a longitudinal direction of the third hole is parallel to a longitudinal direction of the first hole.

In an embodiment of the present invention, a longitudinal direction of the first hole is the same as a longitudinal direction of the second hole.

In an embodiment of the present invention, the back cover has two opposite side walls. The two side walls are disposed on the second surface and both have a trench. The first stand has two third protruding portions. The two third protruding portions are located, respectively, in the two trenches.

In an embodiment of the present invention, the second concave portion has a bottom surface and an inclined plane in which the bottom surface and the inclined plane include an obtuse angle.

In an embodiment of the present invention, the second stand further comprises an extending portion. The extending portion is connected with the first end edge and extends toward a direction away from the second end edge.

In an embodiment of the present invention, a length of the second sub-portion is larger than a distance that the first protruding portion protrudes from the second surface.

In an embodiment of the present invention, the first concave portion is L-shaped in plan view.

In an embodiment of the present invention, a longitudinal direction of the second sub-portion, a longitudinal direction of the second concave portion and a longitudinal direction of the third concave portion are parallel to each other.

In the abovementioned embodiment of the present invention, the sliding engaging member has the first protruding portion and the second protruding portion, and the first stand comprises the first concave portion, the second concave portion and the third concave portion. When the first protruding portion is engaged with the first sub-portion of the first concave portion, the first protruding portion positions the first stand to allow the first stand and the second stand to be in the open state. Under such the state, the second protruding portion is located in the second concave portion. When the first stand is changed from the open state to the closed state, the first protruding portion is moved from the first sub-portion to the second sub-portion at first. In the meanwhile, the second protruding portion moves to the third concave portion to be positioned to allow the first protruding portion to be located at the second sub-portion temporarily. And then, the first stand is able to slide and pivot at the second surface to allow the second sub-portion to depart from the first protruding portion and to allow the third concave portion to depart from the second protruding portion. Accordingly, the first protruding portion and the second protruding portion can be repositioned by connecting with the spring of the sliding engaging member.

The sliding stand assembly of the present invention allows the user to open or close the first stand by only one hand so as to improve convenience for using thereof. And further, the sliding stand assembly does not have the prior hinge structure so as to reduce the cost of parts and materials of the hinge structure.

DETAILED DESCRIPTION

Figure 1:
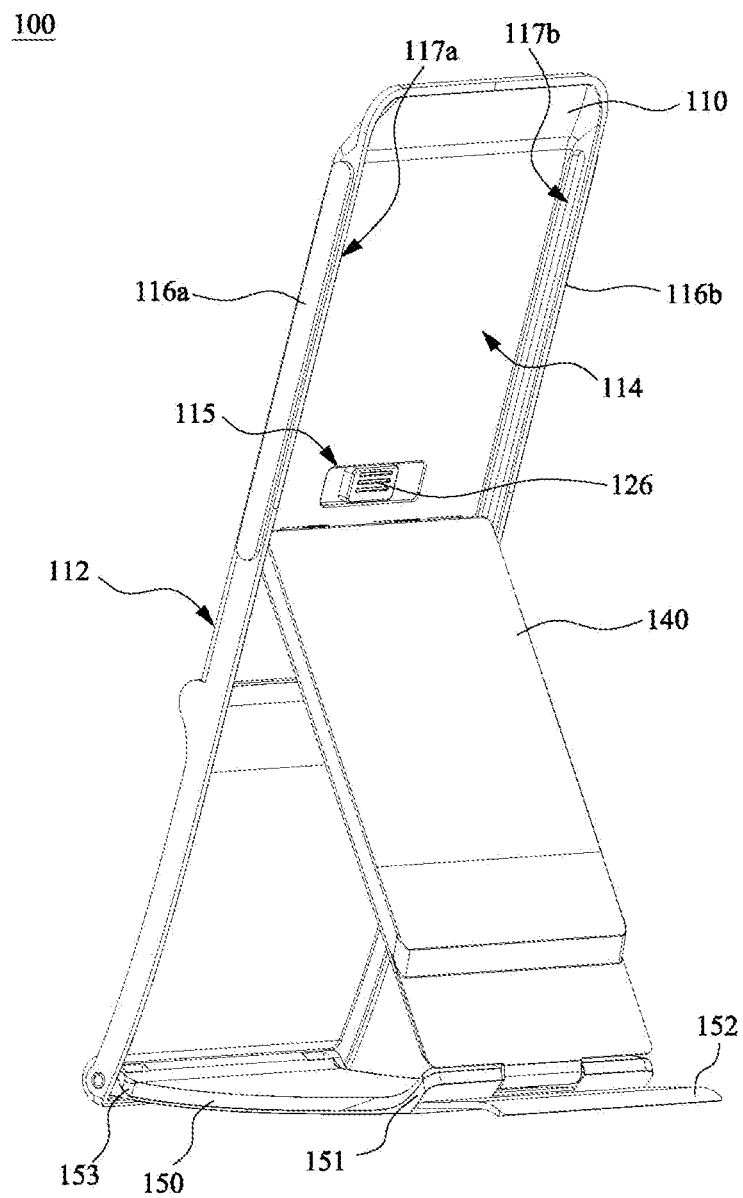
FIG. 1 is a perspective view showing a sliding stand assembly according to an embodiment of the present invention.

The following drawings disclose the present invention several embodiments, for clear illustration, many details of the practice will be described in the following description. However, should understand that the details of these are not practical on the application to limit the present invention. That is, in some embodiments of the invention, the practical details on these non-essential. In addition, to simplify the drawings for the sake of some conventional structures and conventional components in the drawings will be simple in schematic manner depicted.

Figure 2:
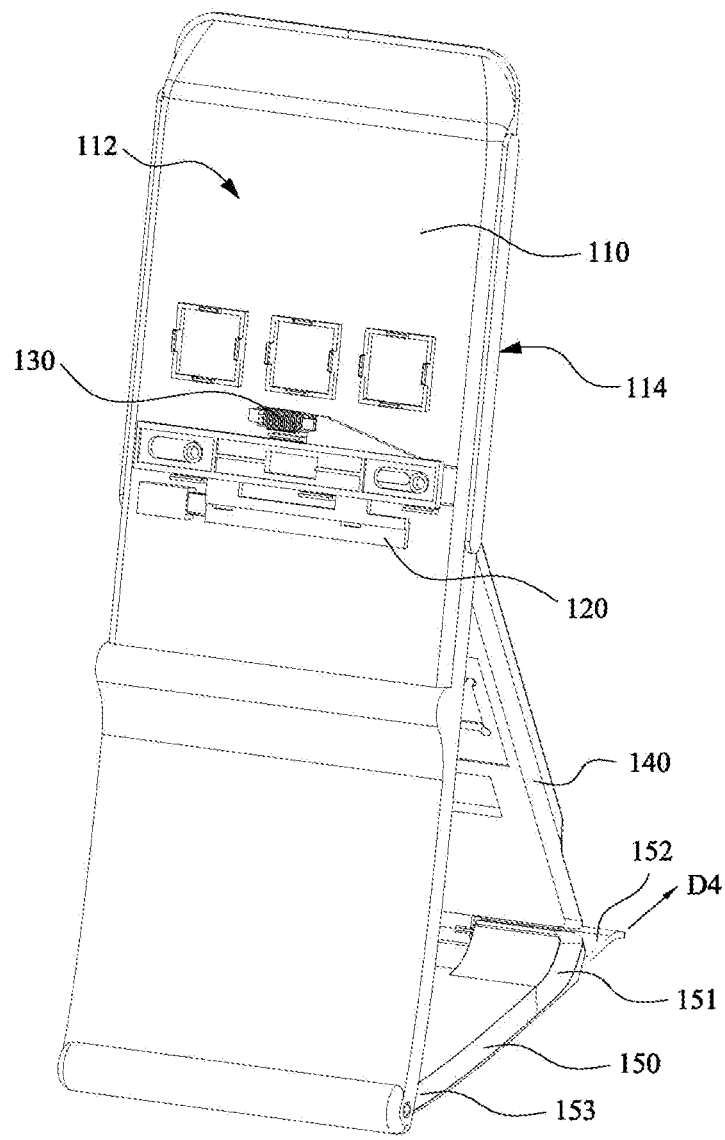
FIG. 2 is another viewing angle of the sliding stand assembly of FIG. 1.

FIG. 1 is a perspective view showing a sliding stand assembly 100 according to an embodiment of the present invention. FIG. 2 is another viewing angle of the sliding stand assembly 100 of FIG. 1. Please refer to FIG. 1 and FIG. 2 simultaneously. The sliding stand assembly 100 comprises a back cover 110, a sliding engaging member 120, a spring 130, a first stand 140 and a second stand 150, in which the back cover 110 has a first surface 112 and a second surface 114 opposite to the first surface 112. The sliding engaging member 120 is located on the first surface 112. The spring 130 is connected with the first surface 112 and the sliding engaging member 120. Furthermore, the first stand 140 is slidably pivoted to the second surface 114 of the back cover 110 to allow the first stand 140 to slide and pivot at the second surface 114. The first surface 112 of the back cover 110 can be fixed to a housing of the electronic device, or the back cover 110 is a part of the housing of the electronic device. In the following description, the structure and connection of each of the abovementioned elements will be illustrated.

Figure 3:
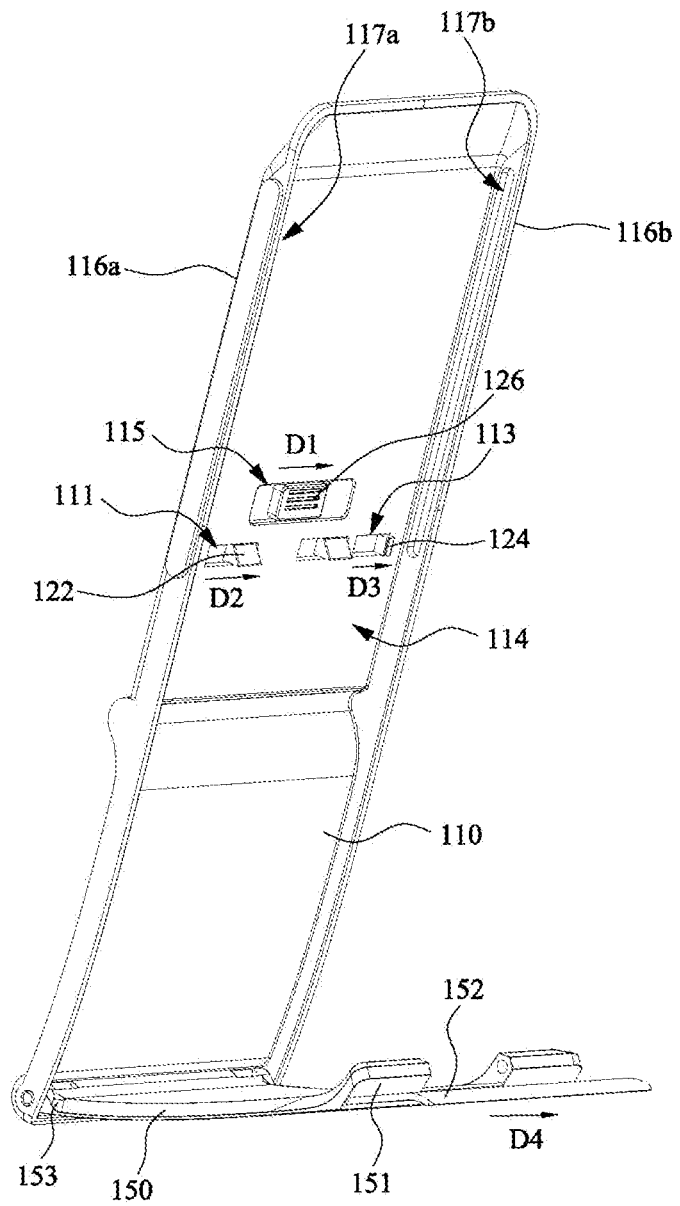
FIG. 3 is a stereogram drawing showing the sliding stand assembly of FIG. 1 which eliminates a first stand.

FIG. 3 is a stereogram drawing showing the sliding stand assembly 100 of FIG. 1 which eliminates a first stand 140. Please refer to FIG. 2 and FIG. 3 simultaneously. The back cover 110 has a first hole 111 and a second hole 113. The first hole 111 and the second hole 113 pass through the first surface 112 and the second surface 114. The sliding engaging member 120 comprises a first protruding portion 122 and the second protruding portion 124. The first protruding portion 122 protrudes from the first hole 111 to the second surface 114. The second protruding portion 124 protrudes from the second hole 113 to the second surface 114. In the preset embodiment, the amount of the first hole 111 and the first protruding portion 122 are both two. However, the present invention is not limited thereto.

In addition, the back cover 110 further has a third hole 115 passing through the first surface 112 and the second surface 114. The sliding engaging member 120 further comprises an operating portion 126, and the operating portion is exposed from the third hole 115. A longitudinal direction D1 of the third hole 115 is parallel to a longitudinal direction D2 of the first hole 111, and the longitudinal direction D2 of the first hole 111 is the same as a longitudinal direction D3 of the second hole 113. That is, the first hole 111 and the second hole 113 are aligned in a horizontal direction.

When the sliding engaging member 120 is not applied by an external force, a pulling force of the spring 130 is able to position the sliding engaging member 120 in advance to allow the first protruding portion 122, the second protruding portion 124 and the operating portion 126 to be located at one side of the first hole 111, the second hole 113 and the third hole 115, respectively. For example, the first protruding portion 122, the second protruding portion 124 and the operating portion 126 are located at right sides of the first hole 111, the second hole 113 and the third hole 115, respectively, as shown in FIG. 3. When the sliding engaging member 120 is applied by the external force, for example, the user pushes the operating portion 126 toward a reverse direction of the direction D1, the first protruding portion 122, the second protruding portion 124 and the operating portion 126 will move simultaneously from the right sides to the left sides of the first hole 111, the second hole 113 and the third hole 115, respectively, to allow the spring being in tension.

In the present embodiment, the sliding stand assembly 100 further comprises a second stand 150. The second stand 150 has a first end edge 151 and a second end edge 153 opposite to the first end edge 151. The first end edge 151 is pivoted to one side, which is opposite to the back cover 110, of the first stand 140, and the second end edge 153 is pivoted to the back cover 110. The sliding stand assembly 100, which has the back cover 110, the first stand 140 and the second stand 150, can be regarded as a three-link rigid body. When the first stand 140 and the second stand 150 are in an open state (as shown in FIG. 2), the sliding stand assembly 110 is difficult to be shaken by the external force. Furthermore, the strength of the sliding stand assembly 100 is increased so as to increase the lifetime.

In addition, the second stand 150 further comprises a extending portion 152. The extending portion 152 is connected with the first end edge 151, and the extending portion 152 extends toward a direction D4 away from the second end edge 153. The user can open or close the first stand 140 and the second stand 150 conveniently through the extending portion 152.

Figure 4:
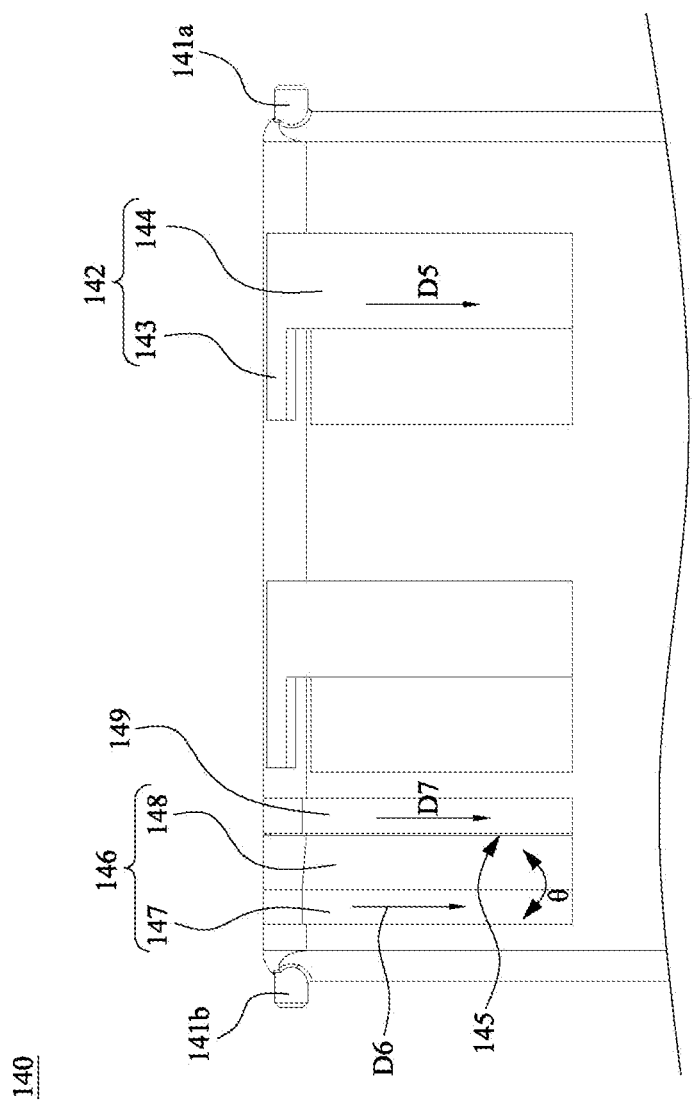
FIG. 4 is a partially stereogram drawing of the first stand of FIG. 1.

FIG. 4 is a partially stereogram drawing of the first stand of FIG. 1. Please refer to FIG. 3 and FIG. 4 simultaneously. The first stand 140 comprises a first concave portion 142, a second concave portion 146 and a third concave portion 149. The first concave portion 142 is disposed corresponding to the first protruding portion 122 and has a first sub-portion 143 and a second sub-portion 144 that are perpendicular to and connected with each other to allow the first concave portion 142 to be L-shaped in plan view. The area of the second sub-portion 144 is larger than that of the first sub-portion 143. The first sub-portion 143 is provided for engaging with the first protruding portion 122, and the second sub-portion 144 is provided for receiving the first protruding portion 122 but has no capability to engage with the first protruding portion 122. The second concave portion 146 is disposed corresponding to the second protruding portion 124 and has a bottom surface 147 and an inclined plane 148, in which the bottom surface 147 and the inclined plane 148 include an obtuse angle θ. The third concave portion 149 is disposed adjacent to a side edge 145 of the second concave portion 146. In particular, the third concave portion 149 is adjacent to a side edge 145, which is opposite to the bottom surface 147, of the inclined plane 148 of the second concave portion 146. In addition, a longitudinal direction D5 of the second sub-portion 144, a longitudinal direction D6 of the second concave portion 146 and a longitudinal direction D7 of the third concave portion 149 are parallel to each other.

In assembly, all the first concave portion 142, the second concave portion 146 and the third concave portion 149 face the second surface 114 of the back cover 110. The back cover 110 has two opposite side walls 116a, 116b. The two side walls 116a, 116b are disposed on the second surface 114. The side wall 116a has a trench 117a, and the side wall 116b has a trench 117b. The first stand 140 has two third protruding portions 141a, 141b. The two third protruding portions 141a, 141b are located, respectively, in the two trenches 117a, 117b to allow the first stand 140 to be slidably pivoted to the back cover 110.

Figure 5:
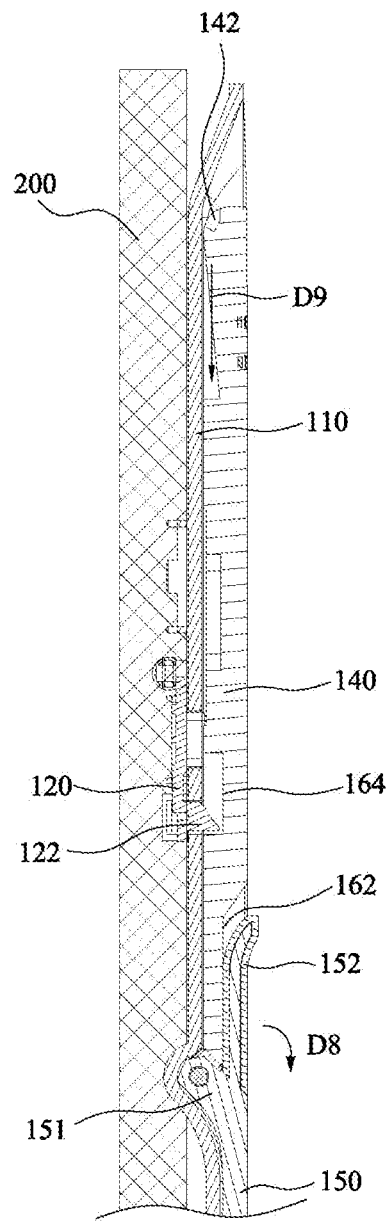
FIG. 5 is a cross-sectional drawing showing the sliding stand assembly of FIG. 1 which is disposed at an electronic device and is in a closed state.

FIG. 5 is a cross-sectional drawing showing the sliding stand assembly 100 of FIG. 1 which is disposed at an electronic device 200 and is in a closed state. The electronic device 220 can be a tablet, a digital photo frame, a desktop all-in-one computer or a thin television. However, the present invention is not limited thereto. The first stand 140 has accommodating concave portions 162, 164. When the first stand 140 and the second stand 150 are in the closed state, the accommodating concave portion 162 is capable of receiving the extending portion 152 of the second stand 150 and the accommodating concave portion 164 is capable of receiving the first protruding portion 122 of the sliding engaging member 120 for improving the evenness of the sliding stand assembly 100 as it is closed.

It shall be understand that, in the above description, the connection between the elements already described will not be described repeatedly. In the following description, the operation method of the sliding stand assembly 100 will be illustrated.

When an external force in a direction D8 is applied on the extending portion 152, one side of the first stand 140 that is connected with the trenches 117a, 117b can slide toward a direction D9 and the other side thereof that is connected with the second stand 150 will move with the first end edge 151 of the second stand 150 toward the direction D8 simultaneously. Accordingly, the first stand 140 and the second stand 150 are in the open state as shown in FIG. 2 and FIG. 6, in which the first protruding portion 122 of the sliding engaging member 120 can be regarded as a positioning location od the first stand 140.

Figure 6:
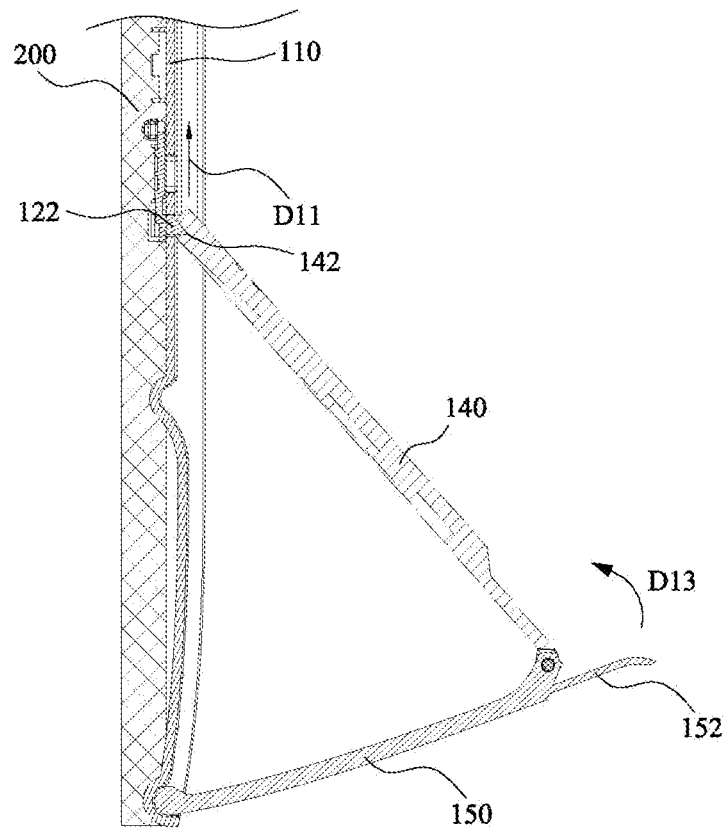
FIG. 6 is a cross-sectional drawing showing the sliding stand assembly of FIG. 5 which is disposed at the electronic device and is in an open state.
Figure 7:
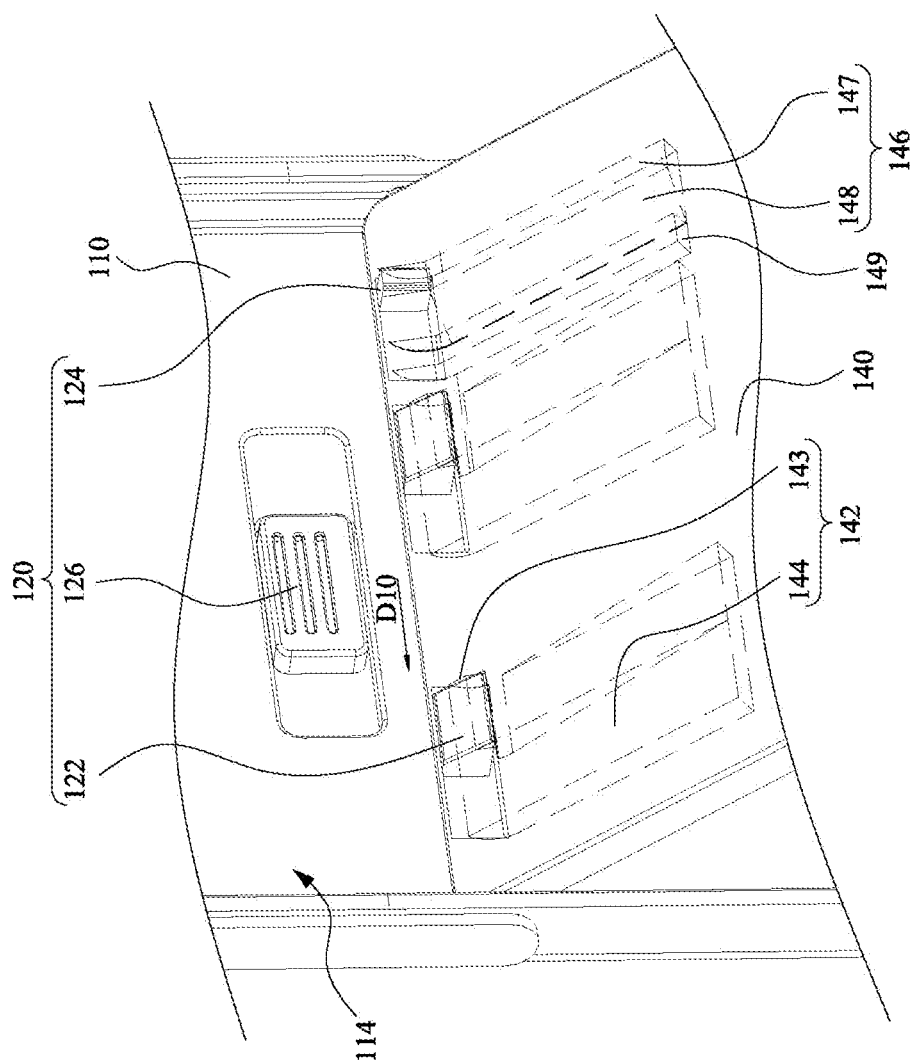
FIG. 7 is a perspective view showing a sliding engaging member and the first stand of FIG. 6.

FIG. 6 is a cross-sectional drawing showing the sliding stand assembly 100 of FIG. 5 which is disposed at the electronic device 200 and is in an open state. FIG. 7 is a perspective view showing the sliding engaging member 120 and the first stand 140 of FIG. 6. To show the structure of FIG. 7 clearly, the first protruding portion 122 and the second protruding portion 124 are represented by solid lines and actually covered by the first stand 140. Please refer to FIG. 6 and FIG. 7 simultaneously. When the first stand 140 and the second stand 150 pivots with respect to the back cover 110 to allow the first stand 140 to slide to the positioning location, the first stand 140 and the second stand 150 are changed from the closed state to the open state. At that time, the first protruding portion 122 is engaged with the first sub-portion 143 to allow the first stand 140 to be positioned by the first protruding portion 122 and include an angle, such as between 30 and 60 degrees, with the back cover 110. In this state, the sliding stand assembly 100 is able to support the electronic device 220 to allow the user to operate (such as touch) or view the images at the display of the electronic device 200. In addition, the second protruding portion 124 is located in the second concave portion 146, that is, on the bottom surface 147 of the second concave portion 146.

Figure 8:
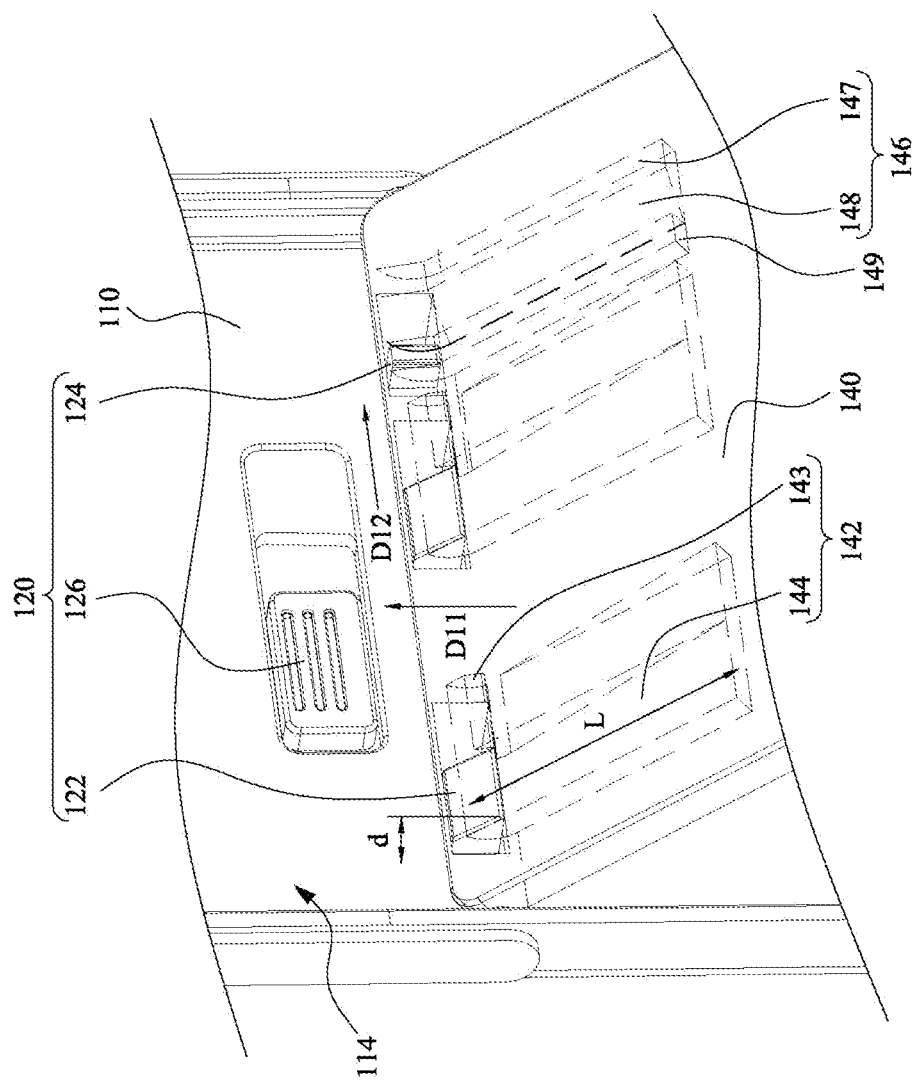
FIG. 8 is a schematic drawing showing positions of a first protruding portion, a second protruding portion, a first concave portion, a second concave portion and a third concave portion after an operating portion of FIG. 7 moves toward a direction.

FIG. 8 is a schematic drawing showing positions of the first protruding portion 122, the second protruding portion 124, the first concave portion 142, the second concave portion 146 and the third concave portion 149 after the operating portion 126 of FIG. 7 moves toward a direction D10. Please refer to FIG. 7 and FIG. 8 simultaneously. The operating portion 126 of the sliding engaging member 120 can be pushed toward the direction D10 when the user wants to change the first stand 140 from the open state to the closed state. And then, the first protruding portion 122 will moves toward the direction D10 from the fist sub-portion 143 to the second sub-portion 144 simultaneously. In the meanwhile, the second protruding portion 124 also moves along the inclined plane 148 of the second concave portion 146 toward the direction D10 to the third concave portion 149 to be positioned. In this state, the design of the third concave portion 149 and the second protruding portion 124 can avoid the sliding engaging member 120 from being retracted toward a direction D12 by the pulling force of the spring 130 (as shown in FIG. 2) so that the first protruding portion 122 can be located at the second sub-portion 144 temporarily. In the present embodiment, a length L of the second sub-portion 144 is larger than a distance d that the first protruding portion 122 protrudes from the second surface 114. Therefore, the second sub-portion 144 has no capability to engage with the first protruding portion 122.

Please refer to FIG. 6 and FIG. 8 simultaneously. After the first protruding portion 122 is located at the second sub portion 144, the first stand 140 can pivot at the second surface and slide toward a direction D11 to depart from the positioning location. When the first stand 140 pivots at the second surface and slides toward the direction D11 to depart from the positioning location, the first protruding portion 122 of the sliding engaging member 120 departs from the second sub-portion 144 of the first concave portion 142 and the second protruding portion 124 departs from the third concave portion 149. Accordingly, the sliding engaging member 120, which has the first protruding portion 122, the second protruding portion 124 and the operating portion 126, can be repositioned by the resilient force of the spring 130 (as shown in FIG. 2) to move toward the direction D12.

The user can apply a force in a direction D13 on the extending portion 152 of the second stand 150 or apply a force in the direction D11 on the first stand 140 when the first protruding portion 122 of the sliding engaging member 120 is located at the second sub-portion 144 of the first concave portion 142 to allow the first stand 140 and the second stand 150 to be capable of pivoting with respect to the back cover 110 so as to be changed from the open state as shown in FIG. 6 to the closed state as shown in FIG. 5.

Because the design of the third concave portion 149 and the second protruding portion 124 can allow the first protruding portion 122 to be positioned in the second sub-portion 144 temporarily, the sliding stand assembly 100 of the present invention allows the user to open or close the first stand 140 by only one hand so as to improve convenience for using thereof. And further, the sliding stand assembly 100 does not have the prior hinge structure so as to reduce the cost of parts and materials of the hinge structure.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A sliding stand assembly adapted for an electronic device, comprising:
    a back cover having a first surface, a second surface, a first hole, and a second hole, wherein the first surface faces away from the second surface, and the first hole and the second hole extend from the first surface to the second surface;
    a sliding engaging member movably arranged at the first surface and comprising:
        a first protruding portion exposed through the first hole and protruding outward from the second surface; and
        a second protruding portion exposed through the second hole and protruding outward from the second surface;
    a spring connected with the first surface and the sliding engaging member;
    a first stand slidably pivoted to the second surface of the back cover and comprising:
        a first concave portion disposed corresponding to the first protruding portion and having a first sub-portion and a second sub-portion that are perpendicular to and connected with each other;
        a second concave portion disposed corresponding to the second protruding portion; and
        a third concave portion disposed adjacent to a side edge of the second concave portion; and
    a second stand having a first end edge and a second end edge opposite to the first end edge, wherein the first end edge is pivoted to the first stand and the second end edge is pivoted to the back cover,
    wherein the first protruding portion is engaged with the first sub-portion and the second protruding portion is located in the second concave portion when the first stand slides to a positioning location to allow the first stand and the second stand to be in an open state with respect to the back cover for supporting the electronic device,
    wherein when the sliding engaging member moves in a first direction and the spring is in tension, the second protruding portion moves in the first direction from the second concave portion to the third concave portion and the first protruding portion moves in the first direction from the first sub-portion to the second sub-portion, thereby enabling the first stand to slide in a second direction substantially perpendicular to the first direction such that the first protruding portion and the second protruding portion of the sliding engaging member depart from the second sub-portion and the third concave portion, respectively, and the first stand and the second stand are in a closed state with respect to the back cover.

2. The sliding stand assembly according to claim 1, wherein the back cover has a third hole passing through the first surface and the second surface and the sliding engaging member further comprises:
    an operating portion exposed from the third hole.

3. The sliding stand assembly according to claim 2, wherein a longitudinal direction of the third hole is parallel to a longitudinal direction of the first hole.

4. The sliding stand assembly according to claim 1, wherein a longitudinal direction of the first hole is the same as a longitudinal direction of the second hole.

5. The sliding stand assembly according to claim 1, wherein the back cover has two opposite side walls disposed on the second surface and both having a trench and the first stand has two third protruding portions in which the two third protruding portions are located, respectively, in the two trenches.

6. The sliding stand assembly according to claim 1, wherein the second concave portion has a bottom surface and an inclined plane in which the bottom surface and the inclined plane include an obtuse angle.

7. The sliding stand assembly according to claim 1, wherein the second stand further comprises:
    an extending portion connected with the first end edge and extended toward a direction away from the second end edge.

8. The sliding stand assembly according to claim 1, wherein a length of the second sub-portion is larger than a distance that the first protruding portion protrudes from the second surface.

9. The sliding stand assembly according to claim 1, wherein the first concave portion is L-shaped in plan view.

10. The sliding stand assembly according to claim 1, wherein a longitudinal direction of the second sub-portion, a longitudinal direction of the second concave portion and a longitudinal direction of the third concave portion are parallel to each other.

* * * * *